United States Patent
Ronnewinkel

(10) Patent No.: US 7,512,580 B2
(45) Date of Patent: Mar. 31, 2009

(54) CONFIDENCE INDICATORS FOR AUTOMATED SUGGESTIONS

(75) Inventor: Christopher Ronnewinkel, Heidelberg (DE)

(73) Assignee: SAP AG, Walldorf (DE)

( * ) Notice: Subject to any disclaimer, the term of this patent is extended or adjusted under 35 U.S.C. 154(b) by 533 days.

(21) Appl. No.: 11/196,968

(22) Filed: Aug. 4, 2005

(65) Prior Publication Data

US 2007/0094217 A1    Apr. 26, 2007

(51) Int. Cl.
G06F 9/44    (2006.01)

(52) U.S. Cl. ............................. 706/52; 706/20; 707/6

(58) Field of Classification Search ............... 706/52, 706/20; 707/6
See application file for complete search history.

(56) References Cited

U.S. PATENT DOCUMENTS

| | | | |
|---|---|---|---|
| 5,752,025 A | 5/1998 | Shakib et al. | |
| 5,765,033 A | 6/1998 | Miloslavsky | |
| 5,793,861 A | 8/1998 | Haigh | |
| 5,799,148 A * | 8/1998 | Cuddihy et al. | 714/26 |
| 5,895,466 A | 4/1999 | Goldberg et al. | |
| 6,055,540 A | 4/2000 | Snow et al. | |
| 6,424,997 B1 * | 7/2002 | Buskirk et al. | 709/206 |
| 6,741,959 B1 | 5/2004 | Kaiser | |
| 6,810,394 B2 | 10/2004 | Coutts et al. | |
| 6,941,304 B2 | 9/2005 | Gainey et al. | |
| 7,043,075 B2 * | 5/2006 | Gutta | 382/158 |
| 7,185,008 B2 | 2/2007 | Kawatani | |
| 7,185,065 B1 * | 2/2007 | Holtzman et al. | 709/217 |
| 2001/0047377 A1 | 11/2001 | Sincaglia et al. | |
| 2002/0065836 A1 | 5/2002 | Sasaki | |
| 2002/0116641 A1 | 8/2002 | Mastrianni | |
| 2002/0133494 A1 | 9/2002 | Goedken | |
| 2002/0198909 A1 | 12/2002 | Huynh et al. | |
| 2004/0083191 A1 * | 4/2004 | Ronnewinkel et al. | 706/20 |
| 2004/0260534 A1 | 12/2004 | Pak et al. | |
| 2005/0193002 A1 * | 9/2005 | Souders et al. | 707/103 X |
| 2005/0234973 A1 * | 10/2005 | Zeng et al. | 707/103 R |
| 2006/0031217 A1 * | 2/2006 | Smith et al. | 707/5 |

FOREIGN PATENT DOCUMENTS

EP    1 199 855    4/2002

(Continued)

OTHER PUBLICATIONS 4.3.2 Case Based Reasoning, obtained at http://www.cs.mdx.ac.uk/staffpages/serengul/ML/hybrid.html—Printed from the Internet on Dec. 9, 2002, 2 pages.

(Continued)

*Primary Examiner*—David R Vincent
*Assistant Examiner*—Mai T Tran
(74) *Attorney, Agent, or Firm*—Fish & Richardson P.C.

(57) ABSTRACT

Systems, computer program products, and associated methods provide for selecting between manual and automatic operating modes based upon previous experience as quantified by confidence indicators. Confidence indicators are values that may each represent a likelihood that an associated candidate class or candidate object matches an incoming message, for example. Confidence indicator values may be updated according to previous manual selections or rejections of the associated class or object, for example. In an exemplary response management system, the selections may be for modes of operation that relate to classification of an incoming message, and/or suggestion of objects, for example.

20 Claims, 7 Drawing Sheets

FOREIGN PATENT DOCUMENTS

| | | |
|---|---|---|
| EP | 1 209 617 | 5/2002 |
| JP | 2000/231520 | 8/2000 |
| JP | 2001/297261 | 10/2001 |
| WO | WO 01/06435 | 1/2001 |
| WO | WO02/080036 | 10/2002 |

OTHER PUBLICATIONS

Product Description of Siebel eMail Response Value Proposition, obtained from www.siebel.com, printed from the Internet on Oct. 23, 2003, 6 pages.

E-Service With Advanced Workflow, obtained from http://www.realmarket.com/news/qlinktech040500.html, printed from the Internet on Apr. 7, 2004, 2 pages.

Product Description of SAP Basic Data (QM-PT-BD), obtained from www.help.sap.com, printed from the Internet on Mar. 24, 2004. 2 pages.

Larkey et al, "Combining Classifiers in Text Categorization," *Proceedings of the 19th Annual International ACM Sigir Conference on Research and Development in Information Retrieval*, Zurich, Aug. 18-22, 1996 pp. 289-297.

Lesser et al., "BIG: An Agent for Resource-Bounded Information Gathering and Decision Making," *Artificial Intelligence*, 118 (2000) 197-244.

Sabastiani, "Machine Learning in Automated Text Categorization" *ACM Computing Surveys* 34: 1, 1-47 (2002).

Yang et al., "A Re-examination of Text Categorization Methods" *School of Computer Science, Carnegie Mellon University*, pp. 42-49.

* cited by examiner

CONFIDENCE INDICATORS FOR AUTOMATED SUGGESTIONS

TECHNICAL FIELD

The disclosure relates to classifying information and providing recommendations based on such classification.

BACKGROUND

The increased capability of computers to store vast amounts of on-line information has led to an increasing need for efficient data classification systems. Data classification systems are especially needed for natural language texts (e.g. articles, faxes, memos, electronic mail, etc.) where information may be unstructured and unassociated with other texts. The effect of this is that users are forced to sift through the increasing amount of on-line texts to locate relevant information. Users require that classification systems provide useful information under particular circumstances and distinguish useful information from other information.

SUMMARY

Systems, computer program products, and associated methods provide for selecting between manual and automatic operating modes based upon previous experience as quantified by confidence indicators. Confidence indicators are values that may each represent a likelihood that an associated candidate class or candidate object matches an incoming message, for example. Confidence indicator values may be updated according to previous manual selections or rejections of the associated class or object, for example. In an exemplary response management system, the selections may be for modes of operation that relate to classification of an incoming message, and/or suggestion of objects, for example.

A system is also disclosed to provide intelligent classification services. The system includes a classifier that provides one or more recommendations based on an incoming message. The system may include a user application that allows an incoming message to be processed by the classifier and may be utilized to respond to incoming messages.

Various aspects of the system relate to providing recommendations and responding to incoming messages. For example, according to one aspect, a method includes receiving a message including a request for information, classifying the request for information based upon features of the message, and providing a recommendation based upon the classification of the message.

In some implementations, providing a recommendation may include providing a solution based on a problem description contained in the incoming message. In other implementations, the recommendation may be a list of identifiers, each of which corresponds to a respective group of one or more suggested persons or entities knowledgeable about subject matter in the problem description.

In another aspect, a method includes comparing the request for information with previous requests for information, and determining which previous requests are most similar to the request for information.

In another aspect, a method includes providing a recommendation by generating a classification result using as input a list of previous requests for information, calculating an accuracy measure using class-weights associated with the candidate classes present in the input, and comparing the accuracy measure to a predetermined value.

In some implementations, the method may also include displaying a class-score indicating a text-mining similarity of a class with the request for information, displaying messages from the candidate classes, sending a recommendation based on the accuracy measure and the predetermined value comparison and routing the message to an expert to associate a response.

In another aspect, a method includes associating a class with the message and associating a tag value to a class-equivalent as indicia of relevance to a class-center.

A system, as well as articles that include a machine-readable medium storing machine-readable instructions for implementing the various techniques, are disclosed. Details of various implementations are discussed in greater detail below.

In some implementations, such as in a customer interaction center context, for example, the system may provide solution recommendations to customers based on an accurate classification of customer problem descriptions, sent via e-mail or any other communications medium, to problems most similar in meaning. The system may provide routing services whereby problem descriptions may be classified and routed to an agent most competent and familiar with the customer problem.

Over time, some responses may be automatically generated for problem descriptions that have previously been manually classified and associated with solution objects. The process of collecting and updating statistics to determine when to transition from manual to automatic generation may be automated. The decision about whether to automatically respond may be made accurately and reliably based on statistics from previous decisions relating to classification and/or response object selection. The statistics may further be used by a system maintainer to identify ways in which the system, classifications, and response object definitions may be adapted to operate more efficiently. Accordingly, productivity may be increased, response time may be decreased, and/or response quality may be improved.

The system may also be used in the context of a sales scenario. For example, if a customer sends a message that contains product criteria relating to a purchase, the system may match such product criteria with product descriptions in a product catalog or with other examples of customer product descriptions to facilitate the sale. The system may also provide cross-sell recommendations for additional purchases. Routing services also may be provided so that the most effective sales agent knowledgeable regarding a particular product is assigned.

Additional features will be readily apparent from the following detailed description, the accompanying drawings and the claims.

DETAILED DESCRIPTION OF ILLUSTRATIVE EMBODIMENTS

Figure 1:
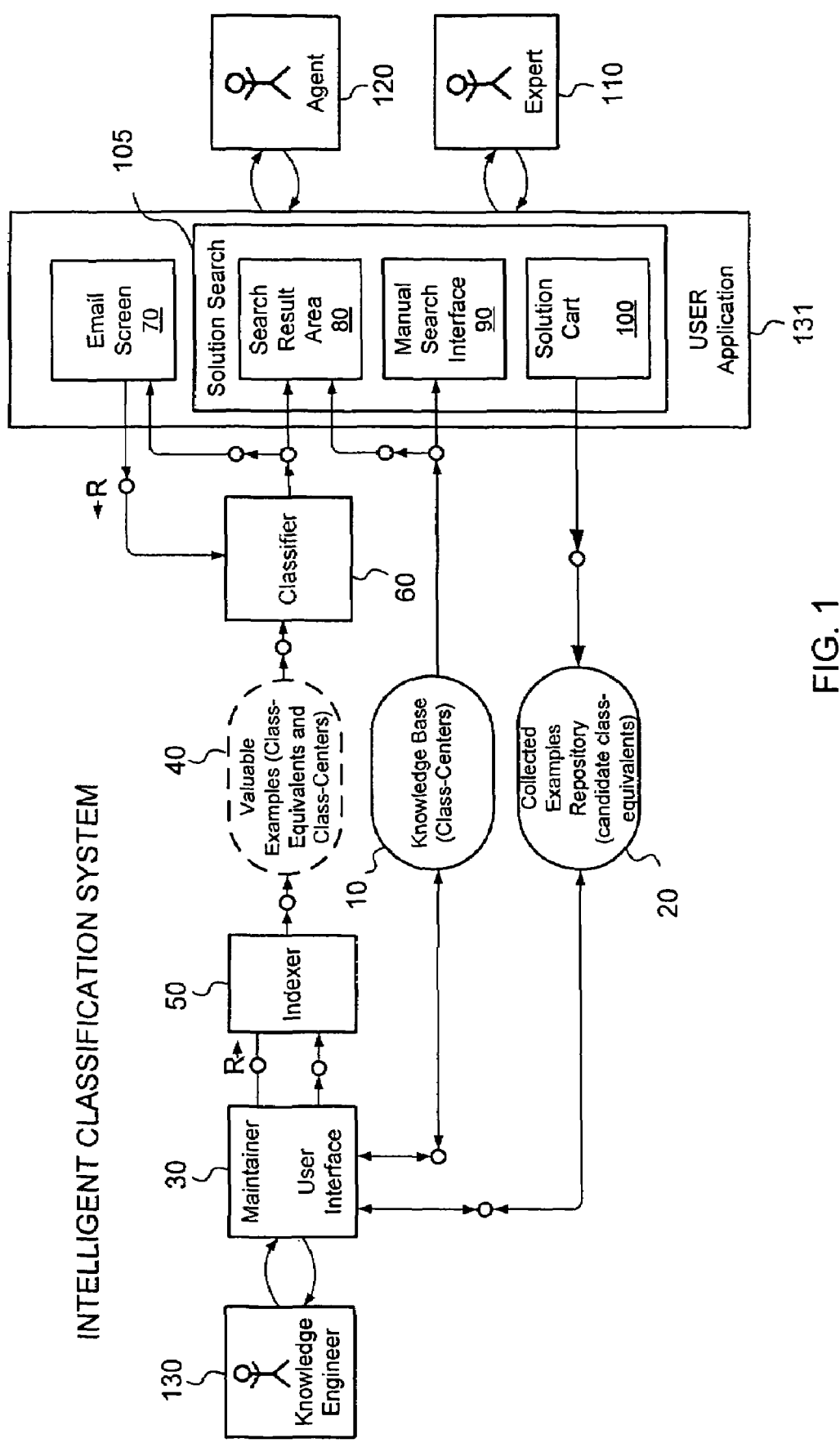
FIG. 1 illustrates a computer-based system for intelligent classification.

As shown in FIG. 1, a computer-based system provides for intelligent classification services. The system is designed to provide automatic recommendations based upon a classification of an incoming message. For example, in one implementation, the system may provide recommended solutions to a given problem description contained in the incoming message. In another implementation, the system may provide a suggestive list of persons or entities given a request for information contained in the incoming message. Such systems are described in commonly-assigned co-pending application Ser. No. 10/330,402, filed on Dec. 27, 2002, by C. Ronnewinkel and M. Kaiser.

As shown in FIG. 1, the system includes a knowledge base 10 that serves as a repository of information. Although only a single knowledge base 10 is illustrated in FIG. 1, the system may be configured to support multiple knowledge bases. The knowledge base 10 may include a collection of documents such as electronic mail (e-mail message), web pages, business documents, faxes, etc. that may be searched by users. In one implementation, the knowledge base 10 stores authoritative problem descriptions and corresponding solutions. Each problem description and corresponding solution stored in knowledge base 10 represents a particular class of problems and may be derived from a previous request for information. Because of this, each problem description and its corresponding solution stored in knowledge base 10 may be referenced to as a class-center.

A repository for collected examples 20 is provided that stores non-authoritative semantically equivalent problem descriptions and pointers to corresponding solutions stored in knowledge base 10. Each non-authoritative semantically equivalent problem description and pointer may be referenced to as a class-equivalent and may be derived from a previous request for information. In one implementation, the determination of class-equivalents may be determined by an expert 110 or by an agent 120. For example, in a call center context, the expert 110 may be an individual familiar with the subject topic of an unclassified problem description. Although only a single expert and agent are illustrated in FIG. 1, the system may be configured to support multiple experts and agents.

A maintainer user interface 30 may be provided that allows a user to edit problem descriptions stored in both the repository of collected examples 20 and knowledge base 10. The user of the interface 30 may be, for example, a knowledge engineer 130 responsible for post-processing and maintenance of class-equivalents stored in the collected examples repository 20 and class-centers stored in knowledge base 10. In one implementation, the knowledge engineer 130 may be responsible for creating additional class-equivalents and editing unclassified problem descriptions to better serve as class-equivalents. In other implementations, maintenance of the collected examples repository 20 and knowledge base 10 may be performed automatically.

Figure 2:
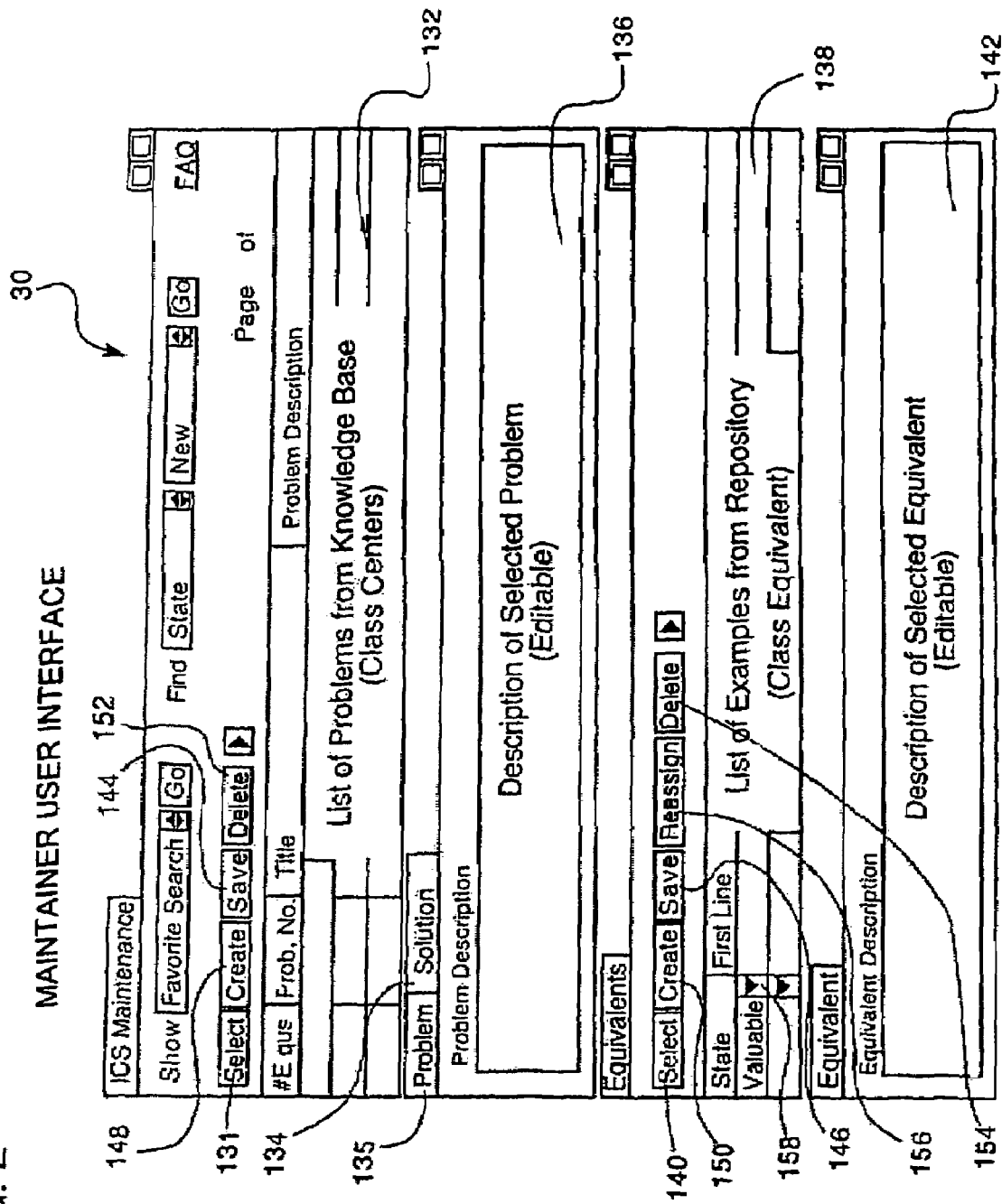
FIG. 2 illustrates a maintainer user interface.

Referring to FIG. 2, the maintainer user interface 30 is illustrated. In one implementation, a list of class-centers 132 stored in knowledge base 10 may be displayed. The knowledge engineer 130 may select a class-center from the list of class-centers 132. Once the knowledge engineer presses a first select button 131, the maintainer user interface 30 may display the problem description relating to the selected class-center in an editable problem description area 136 and any class-equivalents associated with the selected class-center in a list of class-equivalents 138. The knowledge engineer 130 may toggle between the class-center problem description and class-center problem solution by selecting problem description button 135 and problem solution button 134. The knowledge engineer 130 may select a class-equivalent from the list of class-equivalents 138 and press a second select button 140. Once second select button 140 is selected, the maintainer user interface 30 may display the equivalent problem description relating to the selected class-equivalent in an editable equivalent description area 142.

The maintainer user interface 30 provides save functions 144, 146 that store edited problem descriptions in knowledge base 10 and equivalent problem descriptions in the collected examples repository 20. The maintainer user interface may provide create functions 148, 150 that generate class-centers in knowledge base 10 and class-equivalents in the collected examples repository 20. Furthermore, the maintainer user interface 30 may provide delete functions 152, 154 to remove class-centers from knowledge base 10 and class-equivalents from the collected examples repository 20 and a reassign function 156 that may associate an already associated class-equivalent to another class-center.

The maintainer user interface 30 also may provide state information regarding class-equivalents stored in the collected examples repository 20. The state of a class-equivalent may be, for example, "valuable" or "irrelevant." The knowledge engineer may decide which of the collected examples are "valuable" by accessing a state pull-down menu 158 associated with each class-equivalent and selecting either the "valuable" or "irrelevant" option.

Referring to FIG. 1, an indexer 50 is provided that transforms "valuable" class-equivalents stored in collected examples repository 20 and class-centers stored in knowledge base 10 into valuable examples 40, which may also be referred to as a text-mining index, which may be used as input by a classifier 60 to provide automatic solution recommendations. In one implementation, the indexer 50 may be invoked from the maintainer user interface 30. Other implementations may invoke the indexer 50 depending on the number of new or modified class-equivalents stored in the collected examples repository 20 or class-centers stored in the knowledge base 10.

A user application 131 provides access to problem descriptions and solutions in knowledge base 10 and collects class-equivalents for storage in the repository for collected examples 20. In one implementation, the system may be used by agent 120 and expert 110 to respond to incoming customer messages. In other implementations, user application 131 may be provided directly to customers for suggested solutions.

The user application 131 provides an e-mail screen 70 and a solution search display 105 comprising a manual search interface 90, a solution cart component 100, and search result area 80 which displays auto-suggested solutions as well as solutions from manual search interface 90. The user application 131 may be utilized by both an expert 110 and an agent 120 to respond to problem descriptions. Although only a single expert and agent are illustrated in FIG. 1, the system may be configured to support multiple experts and agents. In one implementation, the expert 110 may be an individual possessing domain knowledge relating to unclassified problem descriptions. The agent 120 may be a customer interacting directly with the system or a person interacting with the system on behalf of a customer. Other implementations may blend and vary the roles of experts and agents.

In an illustrative example, a customer may send a request for information including a problem description to the system via an electronic message. An e-mail screen 70 may be implemented where the agent 120 may preview the incoming electronic message and accept it for processing. Once an incoming message has been accepted, the classifier 60 of the intelligent classification system may be invoked automatically and suggest one or more solutions from knowledge base 10 using text-mining index 50. In one implementation, the system may automatically respond to the incoming message based upon a level of classification accuracy calculated by the classifier 60. In other implementations, agent 120 and expert 110 may respond to the incoming message based upon one or more solutions recommended by classifier 60.

Figure 3:
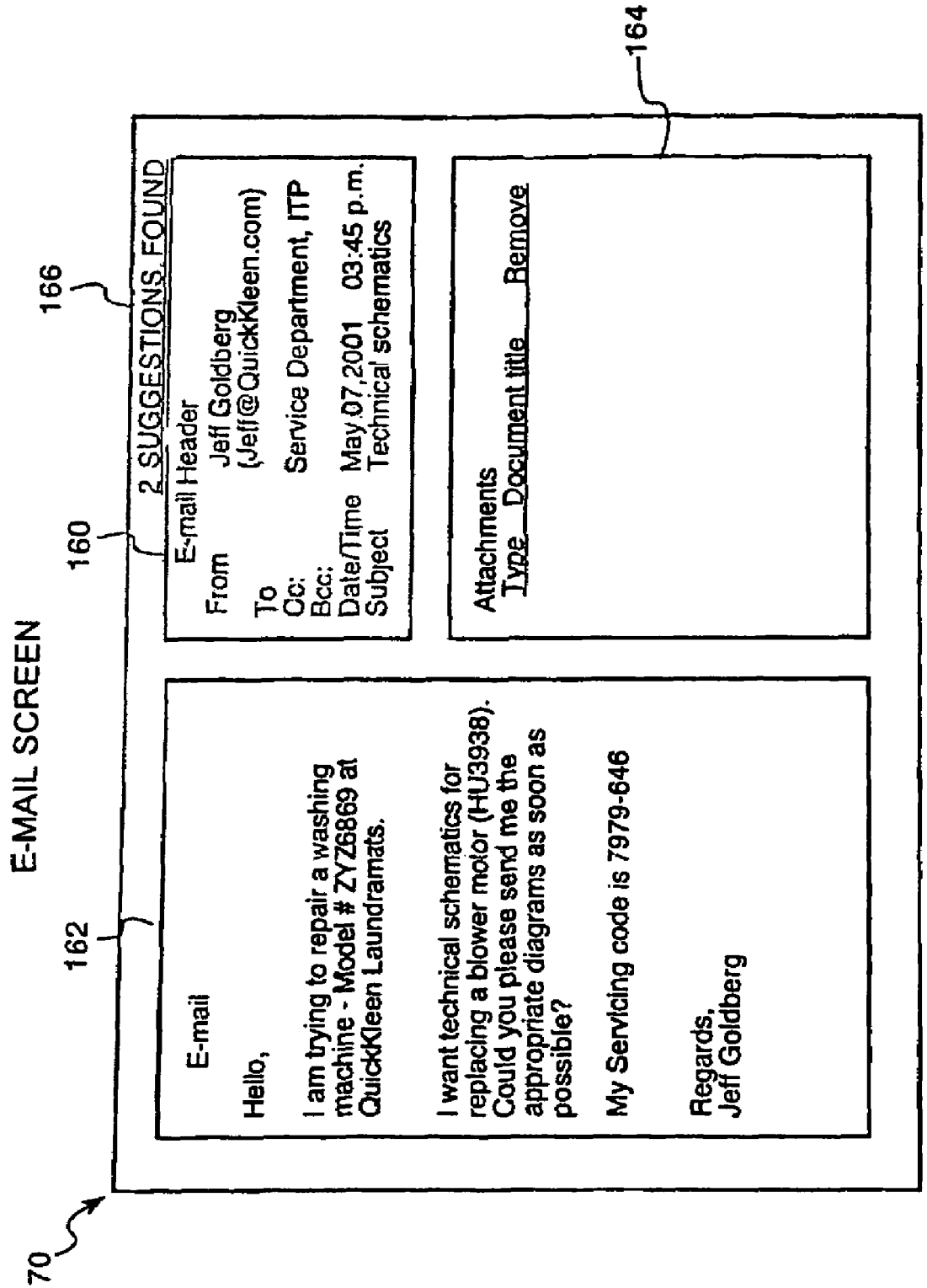
FIG. 3 illustrates a display screen to process incoming messages.

FIG. 3 illustrates an implementation of an email screen 70 that may be accessed by agent 120. The display may include areas for an electronic message header 160 including information about the source, time and subject matter of the electronic message. An electronic message text area 162 may be used to display the problem description contained in the electronic message. Upon acceptance of the electronic message, the classifier 60 may process the electronic message and generate one or more recommended solutions. In one implementation, the number of recommended solutions by the classifier may be displayed as an electronic link 166. Selecting electronic link 166 triggers navigation to the solution search display 105 shown in FIG. 4 described below. After having selected suitable solutions on the solution search display 105, the selected solutions appear on the email screen 70 in an attachments area 164. The objects in the attachments area 164 of display 70 are sent out as attachments to the email response to the customer.

Figure 4:
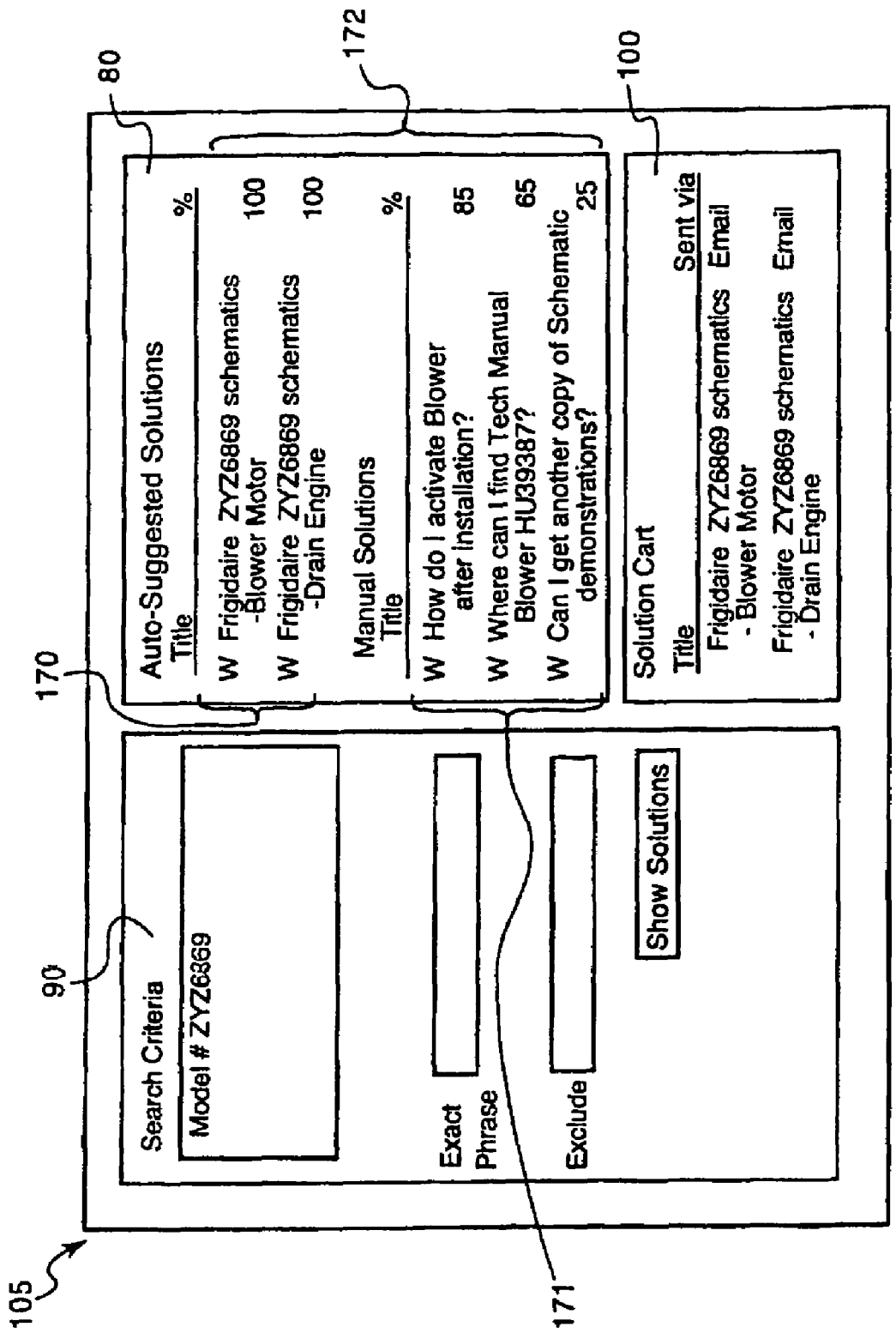
FIG. 4 illustrates a solution search display for responding to incoming messages.

FIG. 4 illustrates an example of the solution search display 105 that also may be used by agent 120 and expert 110 to respond to electronic messages. In one implementation, recommended solutions 170 by classifier 60 may be displayed in search result area 80.

For situations where recommended solutions do not match the problem description sufficiently, a manual search interface 90 of solution search display 105 is provided. The manual search interface 90 may be used to compose and execute queries that retrieve manual solutions 171 (i.e., class-centers) from knowledge base 10.

A class-score 172 indicating the text-mining similarity of the recommended solution to the electronic message also may be provided. In addition, the solution display 105 also may provide drilldown capabilities whereby selecting a recommended solution in the search result area 80 displays detailed problem descriptions and solutions from knowledge base 10 identified by classifier 60.

A solution cart component 100 of solution search display 105 provides a method for collecting and storing new candidates of class-equivalents in collected examples repository 20 and responding to customers with selected solutions. One or more recommendations identified in search result area 80 may be selected for inclusion in the solution cart component 100. In one implementation, storing class-equivalents may be done in explicit form by posing questions to expert 110. In other implementations, storing class-equivalents may be done in an implicit form by observing selected actions by expert 110. Selected actions may include responding to customers by e-mail, facsimile (fax), or web-chat. Either method of feedback, implicit, explicit, or both may be supported by the system.

Classification Module

Referring to FIG. 1, the classifier 60 provides case-based reasoning. The classifier 60 may use the k-nearest-neighbor technique to match a problem description contained in an electronic message with the valuable examples stored in form of a text-mining index 50. The classifier 60 may use a text-mining engine to transform the problem description into a vector, which may be compared to all other vectors stored in text-mining index 50. The components of the vector may correspond to concepts or terms that appear in the problem description of the electronic message and may be referred to as features.

The classifier 60 may calculate the distance between the vector representing the customer problem and each vector stored in text-mining index 50. The distance between the vector representing the customer problem description and vectors stored in text-mining index 50 may be indicative of the similarity or lack of similarity between problems. The k vectors stored in text-mining index 50 (i.e. class-centers and class-equivalents) with the highest similarity value may be considered the k-nearest-neighbors and may be used to calculate an overall classification accuracy as well as a scored list of potential classes matching a particular problem description.

Figure 5:
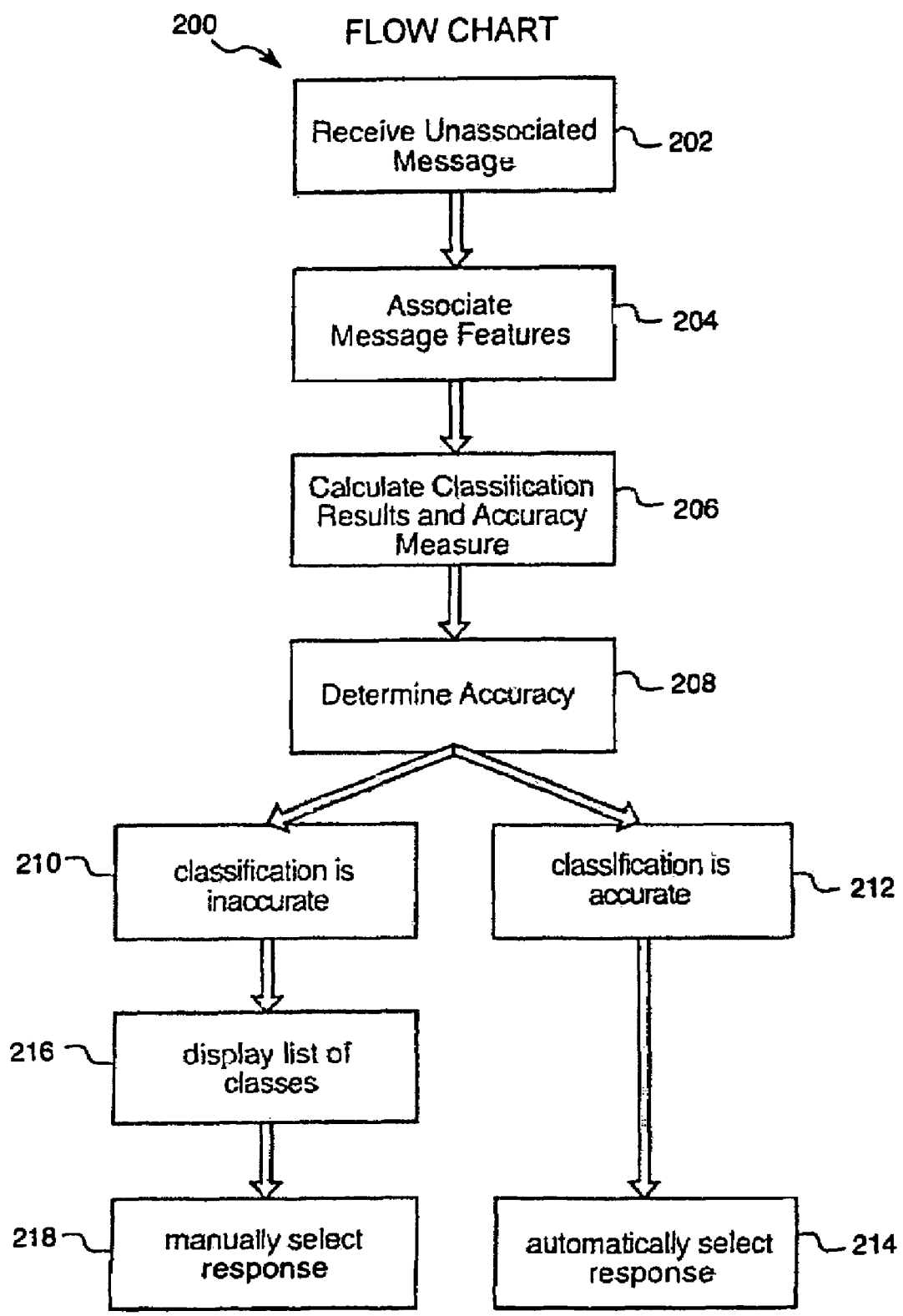
FIG. 5 illustrates a flow chart for the classification process implemented by the classifier.

Referring to FIG. 5, a flow chart 200 of an implementation of the classifier 60 is illustrated. An electronic message is received 202 that is not associated with a class where a class is an association of documents that share one or more features. The message may include one or more problem descriptions.

The classifier 60 transforms the message into a vector of features 204 and may calculate a classification result 206 that includes a list of candidate classes with a class-weight and a class-score for each candidate class, as well as an accuracy measure for the classification given by this weighted list of candidate classes.

For each neighbor $d_i$ (where i=1, ..., k), the text-mining search engine may yield the class $c_i$ to which the neighbor is assigned to and a text-mining score $s_i$ that may measure the similarity between the neighbor and the unassociated message. Within the k-nearest-neighbors of the unassociated message, only $\kappa < k$ distinct candidate classes $\gamma_j$ (where j=1, ..., $\kappa$) are present.

Based on the above information of the k-nearest-neighbors, the classifier 60 may calculate the classification result. In one implementation, the classification result may include a class-weight and a class-score.

The class-weight $w_j$ may measure the probability that a candidate class $\gamma_j$ identified in text-mining index 50 is the correct class for classification. In one implementation, class-weights may be calculated using the following formula:

Class-weights proportional to text-mining scores for j in the set of 1, ..., $\kappa$:

$$w_j = \sum_{c_i = c_j} s_i / \sum s_i$$

(summed over $i = 1, \ldots, k$)

In other implementations, class-weights also may be calculated using text-mining ranks from the text-mining search assuming the nearest-neighbors $d_i$ are sorted descending in text-mining score. Class-weights using text-mining ranks may be calculated using the following formula:

Class-weights proportional to text-mining ranks for j in the set of 1, ..., κ:

$$w_j = \sum_{c_i=c_j}(k+1-i) / \sum (k+1-i) = 2 \sum_{c_i=c_j} \frac{k+1-i}{k(k+1)}$$

(summed over $i = 1, \ldots, k$)

The classifier 60 also may calculate an accuracy measure σ that may be normalized (i.e. $0 \leq \sigma \leq 1$) and that signifies the reliability of the classification.

Class-weights also may relay information regarding how candidate classes $\gamma_j$ are distributed across the nearest-neighbors and may be used as a basis to calculate an accuracy measure. For example, normalized entropy may be used in combination with definitions of class-weights using the following formula for classification accuracy:

$$\sigma^{(n)} = 1 - S/S_{max} = 1 + \sum_{j=1}^{\kappa} w_j \log_n w_j,$$

where n=k for a global accuracy measure; and n=κ for local accuracy measure.

The global accuracy measure may take into account all classes, while the local accuracy measure may only account for classes present in the k-nearest-neighbors.

The classifier 60 may also calculate class-scores which may be displayed to agent 120 and expert 110 to further facilitate understanding regarding candidate classes and their relatedness to the unassociated message. In contrast to the normalized class-weights, class-scores need not sum to one if summed over all candidate classes.

For example, if the focus of the user is on classification reliability, classifier 60 may set the class-score equal to class-weights. Alternatively, if the focus of the user is on text-mining similarity between candidate classes and the unassociated message, the classifier 60 may allow the class-score to deviate from the class-weights. In one implementation, the class-score $t_j$ may be calculated as an arithmetic average of the text-mining scores per class using the following formula (for each j in the set of 1, ..., κ):

$$t_j = \sum_{c_i=c_j} s_i / \sum_{c_i=c_j} 1$$

(summed over $i = 1, \ldots, k$)

In another implementation, class-score may be calculated as the weighted average of the text-mining scores per class using the following formula (for each j in the set of 1, ..., κ):

$$t_j = \sum_{c_i=c_j}(s_i)^2 / \sum_{c_i=c_j} s_i$$

(summed over $i = 1, \ldots, k$)

In other implementations, class-score may be calculated as a maximum of text-mining scores per class using the following formula (for each j in the set of 1, ..., κ):

$$t_j = \max_{c_i=c_j}(s_i)$$

(evaluated over $i = 1, \ldots, k$)

The class-score calculated by the arithmetic average may underestimate the similarity between the class and the unassociated message if the variance of the text-mining scores in the class is large. In contrast, the class-score calculated as a maximum text-mining score per class may overestimate the similarity. The class-score calculated as the weighted average may be a value between these extremes. Although three class-score calculations have been disclosed, classifier 60 may support additional or different class-score calculations.

Referring to FIG. 5, the classifier 60 may determine if the classification is accurate 212 based upon the calculated accuracy measure. In one implementation, the classifier 60 automatically selects 214 a response to the incoming message incorporating a solution description. If the classification is inaccurate 210, based upon the accuracy measure value, the classifier 60 may display 216 class-centers and class-equivalents and allow the agent 120 and expert 110 to manually select 218 a response including a solution description from the classes displayed.

The intelligent classification system provides generic classification services. In one implementation, for example, the system may serve as a routing system or expert finder without modification. The system may classify problem descriptions according to the types of problems agents have solved so that customer messages may be automatically routed to the most competent agent. The recommendation also may be a list of identifiers, each of which corresponds to a respective group of one or more suggested persons or entities knowledgeable about subject matter in the problem description.

The system, however, is not limited to incoming problem descriptions. In one implementation, the system may be used in a sales scenario. For example, the system may classify an incoming customer message containing product criteria with product descriptions in a product catalog or with other examples of customer descriptions of products to facilitate a sale.

Confidence Indicators

Some intelligent classification systems may evaluate classification accuracy and/or response object selection accuracy by evaluating statistics for prior decisions relating to the classification and response object selection processes. Using figures of merit referred to herein as confidence indicators, the accuracy of these processes may be quantified. In one embodiment, the accuracy may be used to determine whether a classification, such as a candidate class in a response management system, may be automatically suggested. In another embodiment, the accuracy may be used to determine whether an object, such as a response object in a response management system, may be automatically suggested. In other embodiments, the accuracy may be used to determine between automatic and manual modes of operation for both classification and object suggestion.

The value of a confidence indicator for a response object, for example, may be based on the number of times that the response object has been manually accepted by an agent, compared to the number of times it has been suggested by the intelligent classification system. As statistical data accumulates over time, confidence indicators may be updated according to one of a number of mathematical models. For example, each time a suggestion is manually accepted, the confidence indicator associated with that suggestion may be incrementally increased by a predetermined amount, which may be fixed, exponentially varying, or the like. In some implementations, a particular suggestion may be automatically generated if the confidence indicator exceeds a predetermined threshold. As such, confidence indicators may be used to reduce or eliminate manual involvement in the process of responding to problem descriptions that are associated with classifications and/or response objects that have a sufficiently high confidence indicator.

In an illustrative example, an exemplary response management system may receive incoming messages that the system classifies into one or more categories. The categories may be arranged in a hierarchical structure, as described in commonly-assigned co-pending U.S. application Ser. No. 10/822,363, filed Apr. 12, 2004, by C. Ronnewinkel, et al., the entire contents of which are incorporated by reference. Each category may be associated with (i.e., linked to) one or more solution objects (e.g., candidate responses). Confidence indicators may be associated with at least some of the category-solution links. In response to an incoming message that is classified into one or more categories, for example, the system may evaluate the confidence indicator values for each link associated with one of the selected categories, or with a response object, for example.

Figure 6:
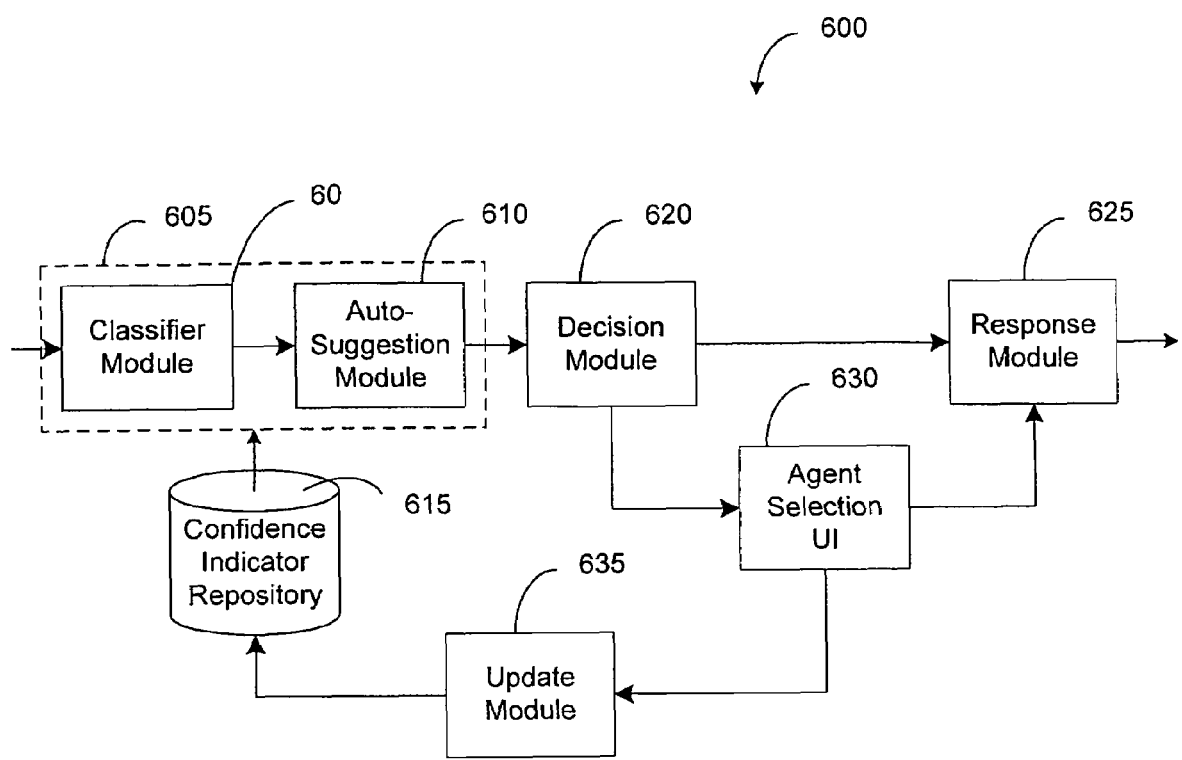
FIG. 6 illustrates a system for auto-responding to incoming messages using confidence indicators.

FIG. 6 illustrates a system 600 that incorporates confidence indicator functionality in an embodiment of a response management system. The system 600 includes an embodiment of the classifier 60. In this embodiment, the classifier (or classification module) 60 is combined with an auto-suggestion module 610 to provide a recommendation module 605, the operation of which will be described in detail with reference to FIG. 7. The classifier module 60 may receive as input messages that have, for example, textual content that may be classified, as described elsewhere herein, according to information stored in a classifier repository (not shown), such as the text mining index 50 (FIG. 1).

To provide for the use of confidence indicators in the modules 60, 610, the recommendation module 605 is coupled to access a confidence indicator repository 615, which contains information relating to previous classification and auto-suggestion decisions that may have been made by the classifier module 60 and the auto-suggestion module 610, respectively. In addition to historical information, the confidence indicator repository 615 may store information that relates to, for example, the maintenance, updating, or initialization of individual confidence indicators. Tables, metadata, and/or pointers to associated information in other databases, such as those containing classification or response object information, may also be associated with the confidence indicator repository 615.

The output of the recommendation module 605 may include a classification accuracy ($\sigma$) (e.g., calculated according to the formula discussed above) from the classifier module 60, and an auto-suggestion accuracy ($\sigma'$) from the auto-suggestion module 610. This output is received by a decision module 620, which determines whether the candidate classes or auto-suggested response object candidates are accurate enough to allow an automated response in which no manual intervention steps need be performed by an agent.

The decision module 620 is coupled to a response module 625 and an agent selection user interface (UI) 630. If the decision module 620 determines that the accuracy $W(\sigma,\sigma')$ is sufficient to permit an auto-response, then the response module 625 may process and send the selected auto-suggested classification or response object. However, if the decision module 620 determines that the accuracy $W(\sigma,\sigma')$ is not sufficient to permit an auto-response, then the agent selection UI 630 may prompt the agent for, and receive, manual input to select or prepare an appropriate response object to pass to the response module 625 for processing and sending.

In the event that the agent selection UI 630 is activated, the resulting selection data is reported to an update module 635. In the update module, statistical information is recorded and processed to reflect the agent's selection. In particular, the confidence indicators associated with the classification and/or auto-suggested response object(s) either selected or rejected by the agent are updated according to an update algorithm, examples of which are described below. Updated information may be stored in the confidence indicator repository 615.

Figure 7:
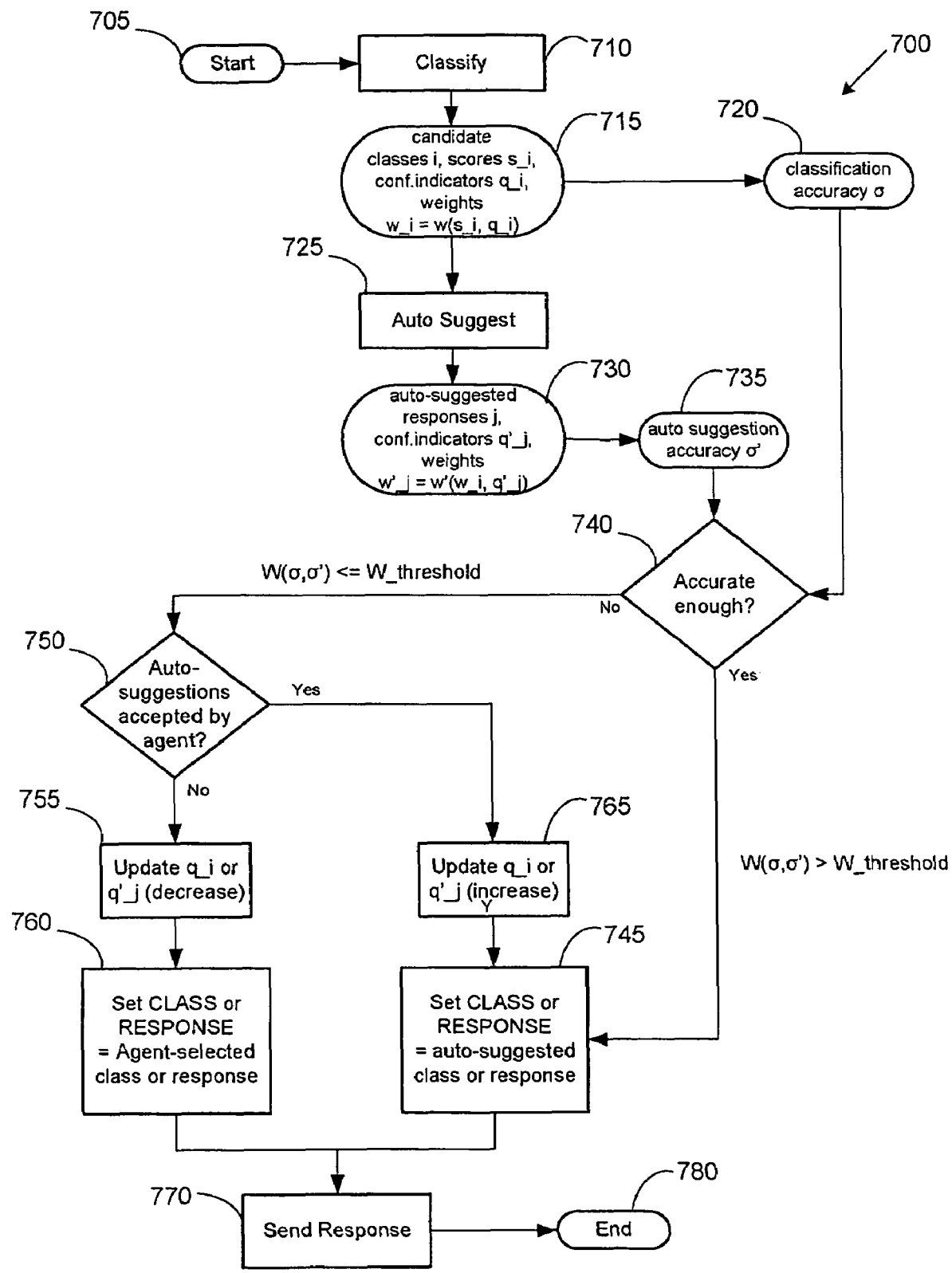
FIG. 7 illustrates a flow chart for a method of automated response using confidence indicators.

The exemplary system 600 may be operated according to a method described by a flowchart 700 as shown in FIG. 7. The flowchart describes an exemplary run-time method that may be performed to compute, update, and apply confidence indicators to determine whether to auto-respond to incoming messages.

The method starts at step 705 in response, for example, to receipt of an incoming message. The classifier module 60 classifies the message at step 710 according to a prescribed classification method (e.g., example-based classification combined with query-based classification). This classification of this example yields, at step 715, a list of candidate classes. For each class (i), a score ($s\_i$) (e.g., calculated according to one of the formulae discussed above) that indicates how well the textual content fits the class may be determined according to methods described elsewhere herein. For each class, a confidence indicator ($q\_i$) that indicates how often the class was correctly (i.e., successfully) suggested in the past is determined based on information stored in the confidence indicator repository 615. Weights($w\_i=w(s\_i, q\_i)$) are determined (e.g., computed) as a function of the scores and confidence indicator for each candidate class.

In addition, at step 720, the classifier module 60 determines a classification accuracy ($\sigma$) (e.g., calculated according to the formula discussed above) that describes how clear-cut the list of candidate classes can be represented by a single class.

For example, if the candidate classes comprise a chain of sub-classes in which all candidate classes lie on the same path in the class hierarchy, then there is no ambiguity for the system into which path the incoming message fits into. From the systems perspective, the classification is maximally accurate. As such, the classification accuracy may be determined to have a maximum value (e.g., $\sigma=1$), and the lowest-level class in this chain may be regarded as the focus class giving the most detailed classification.

The list of candidate classes, class scores $s\_i$, and/or weights $w\_i$, are passed to the auto-suggestion module 610 for processing at step 725. The auto-suggestion process yields, at step 730, a list of candidate objects for suggestion. For each candidate object (j), a confidence indicator ($q'\_j$) that indicates how often the object was correctly (i.e., successfully) suggested in the past is determined based on information stored in the confidence indicator repository 615. Weights ($w'\_j=w'(w\_i, q'\_j)$) (e.g., calculated according to the weight formula discussed above) are determined (e.g., computed) as a function of the scores and confidence indicator for each candidate object.

In addition, at step 735, the auto-suggestion module 610 determines an auto-suggestion accuracy ($\sigma'$) (e.g., calculated according to the formula discussed above) that describes how clear-cut the list of candidate objects can be represented by a single object.

At step 740, the decision module 620 evaluates the classification accuracy (σ) and the auto-suggestion accuracy (σ') against one or more predetermined criteria, or thresholds. In this example, the decision module compares a threshold value (W_threshold) to a function (W(σ,σ')), which may be a weighted function, for example, of the classification and auto-suggestion accuracies. In an alternative example, the classification and auto-suggestion accuracies may be independently compared to two independent thresholds that may be set to different values. If the decision module 620 determines that the accuracy W(σ,σ') is sufficient to permit an auto-response, then the response module 625 may set class or response to the selected auto-suggested classification or response object at step 745.

However, if the decision module 620 determines at step 740 that the accuracy W(σ,σ') is not sufficient to permit an auto-response, then, at step 750, the agent selection UI 630 may check with the agent to determine if the auto-suggested class or response are acceptable. If the agent rejects the suggested class or response object, then the update module 635 is prompted to update the rejected confidence indicator q_i at step 755 by incrementally decreasing the value of q_i, and, at step 760, setting the class or response to the agent-selected classification or response object. However, if the agent accepts the suggested class or response object, then the update module 635 is prompted to update the rejected confidence indicator q_i at step 765 by incrementally increasing the value of q_i, and, at step 745, setting the class or response to the agent-selected classification or response object.

Having set the class or response in either step 745 or step 760, the response module 625 processes the class or sends the response in step 770, and the method 700 ends at step 780. Following the step 760, processing of the response may be completed, for example, by emailing the response to the appropriate person.

The foregoing examples are intended to be illustrative of a preferred embodiment. In other embodiments, the methods and apparatus may be performed or arranged in one or more different sequences, or organizations, and may include fewer or more steps or components, for example. Some examples may include a program of instructions that is tangibly embodied in an information carrier. When executed by a processor, the program of instructions may perform steps of the method. The information carrier may be included in an apparatus capable of performing the method, such as an embodiment of an intelligent classification system.

Updating Confidence Indicators

Confidence indicators may be updated, for example, each time an agent selects either to accept or to reject an auto-suggested response. The confidence indicator may be automatically computed on an ongoing basis as responses are suggested and responses are used. The confidence indication may provide a number that can be compared to a threshold. The threshold for each classification of response may be set by the maintainer of the system. The value of the confidence indicator may be updated using various techniques such as, for example, various forms of weighted and moving averages.

In one example, the confidence indicator may be expressed as a percentage of correct suggestions. This express may be computed as a ratio of the number of times that a particular auto-suggested response was suggested and used (selected) by the agent ($N_{AU}$), to the total number of times that the auto-suggested response was suggested ($N_S$).

$$C.I. = \frac{N_{AU}}{N_S}$$

The numbers $N_{AU}$ and $N_S$ may be maintained, for example, in counters in the confidence indicator repository 615 of FIG. 6. In some embodiments, these numbers may be recorded in memory for only a predetermined number of the most recent previous responses. In some embodiments, a minimum number of previous responses may be required to qualify for the computed confidence ratio to qualify as a basis for switching the system to respond to in the auto-response mode. In some embodiments, a qualifying number of minimum responses may be limited to, for example, a predetermined recent period of time and/or a particular agent.

In another example, the confidence indicator may be calculated using an iterative formula. In some embodiments, this may avoid numerical overflow of the counters.

$$C.I.(\tau+1) = (1-\epsilon)C.I.(\tau) + \epsilon\Delta(\tau)$$

Using this approach, the next confidence indicator value is the previous value times a number between zero and one, plus the product of a user-selectable parameter $\epsilon$ and $\Delta(\tau)$, where $\epsilon$ controls the rate of adaptation, and $\Delta(\tau)$ is 1 if the agent actually uses the auto-suggested response, but zero if the agent does not. This approach does not require counters that may be subject to overflow.

In the foregoing approach, the parameter $\epsilon$ may take on values between zero and one. If $\epsilon=0.5$, for example, the new confidence indicator value is based equally on a contribution from the previous confidence indicator value and the current determination as to whether the agent actually used the auto-suggested response. However, if $\epsilon<<0.1$, for example, the new confidence indicator value is based primarily on the previous confidence indicator value. The value is incrementally increased each time the agent actually used the auto-suggested response, and incrementally decreased each time the agent did not. Thereby, the confidence indicator adapts to a value which after normalization is given by $N_{AU}/N_S$. In particular embodiments, normalization may involve calculating a sum ($\Sigma C.I.$) of all confidence indicators included in $N_S$, and dividing each confidence indicator by $\Sigma C.I.$ Accordingly, $\epsilon$ may be defined for each classification separately as $\epsilon(\tau)$ in order to individually weigh the severity of the match or the mismatch of the auto suggested response.

In various embodiments, the computation of a confidence indicator may be modified or adapted to use a different formulation to provide a different characteristic behavior from the foregoing examples, but achieve the same basic result of adjusting a confidence indicator based on selection or use of auto-suggested responses. In some cases, the confidence level may have a maximum at values other than one. For example, increased confidence levels may be indicated by a confidence indicator value that approaches zero. Other mathematical representations, including reciprocals, exponentials, logarithms, or unbounded limits may be used to represent relative levels of confidence indicator values.

The statistical records used to determine or update the confidence indicators, such as counts of previous suggestions and uses of particular responses to classifications, may be adapted to accumulate various statistical techniques. For example, counts of the number of times a response has been suggested ($N_S$) and actually used ($N_{AU}$) may be a moving average of a predetermined number of previous suggestions (e.g., last 50 occurrences of a particular classification), or an average over a predetermined time period (e.g., last 2 weeks). The maintainer may selectively edit data that is obsolete, erroneous, exceptional (e.g., outlier), or otherwise undesirable input to the confidence indicator value.

Furthermore, some formulations of the update algorithms, methods, or systems may take differing user characteristics into account. For example, the response selections of an experienced operator may be more heavily weighted than the response selections of a less-experienced operator (e.g., by corresponding choices of values for $\epsilon(\tau)$). As such, the impact on the confidence indicator values of less experienced operators may be discounted. Similarly, discount factors may be applied to the confidence indicator updating algorithms on other bases, such as the relevance of a classification to the operator's area of qualification or expertise.

In addition to uses for selecting auto-suggested responses, the confidence indicator techniques and associated apparatus may be applied to auto-suggested categories, objects, or links, such as may be used in query-based classification systems.

As has been described, and in accordance with certain embodiments described in this disclosure, the process of automatically responding to an incoming message may be further refined through the use of confidence indicators. In some examples, a confidence indicator may be a value or index associated with a particular solution and a particular classification.

In some implementations, confidence indicators may indicate a level of confidence in the quality of a "link," or association, between a particular classification (or category) and an object. The confidence indicator values may be used to rank links between the particular classification and available objects. Confidence indicators may also be used to identify which category-solution link has the highest confidence indicator value. In one example, the object associated with the highest confidence indicator value may be selected for further operations, such as an auto-response function. In some embodiments, only confidence indicator values that exceed a predetermined threshold may qualify to be considered for further operations.

In some examples, confidence indicators may be considered to be a value associated with a link defined between a particular classification (e.g., a category), and a particular object (e.g., solution). The classification may be a category, such as a hierarchical category.

In various embodiments, a new intelligent classification system may use compiled statistics to select between two modes of operation based on a computed "confidence" that an agent would select a particular response to a message having a particular classification. In the first (low confidence) mode, an agent manually selects how to respond to an incoming message. In the second (high confidence) mode, the new system may auto-suggest or auto-respond to incoming messages. The second mode may be selected when an incoming message falls into a classification in which a high level of confidence has been established.

Whether a high confidence has been established is determined from the classification of the incoming message, the frequency with which particular responses have been selected to respond to incoming messages having the same classification, and a predetermined confidence threshold. If a particular response associated with the classification exceeds the confidence threshold, then the system may, for example, automatically suggest responses or automatically respond to that particular content without agent involvement.

In processes that can automatically suggest a proposed classification (e.g., an auto-suggested category) based on textual and context information, a human operator (agent) may be prompted to accept or reject auto-suggested proposals. In such processes, the operator's manual selections may be monitored and recorded, or compiled for statistical analysis. For example, the process may track how many times a particular classification has been auto-suggested to the agent, and how many times the agent actually selected and used an auto-suggested object to respond to an incoming message.

In one implementation, a text-processing system, such as an Email Response Management System (ERMS), is capable of maintaining confidence indicators that correspond to decisions made by the system while processing textual information. For example, the ERMS may maintain a separate confidence indicator associated with automatic suggestions of email content categorization, email response templates, and response solutions. When an agent accepts an automatic suggestion for one of these functions, the corresponding confidence indicator may increase. Conversely, if the agent rejects the automatic suggestion, the corresponding confidence indicator may decrease. Accordingly, confidence indicator values for some classifications may be established, for example, through statistical records from on-line usage by recording suggested responses and actual responses linked to specific classifications.

Alternatively, confidence indicator values may be established by using other methods. In one case, confidence indicators may be established by an operator who can determine an initial value for the confidence indicators. For example, the knowledge engineer 130 may impose an initial, a minimum, or a maximum value for the confidence indicator associated with a link between a particular response and a particular classification. In certain implementations, the knowledge engineer 130 may alter the update dynamics of the confidence indicator, for example, by defining the incremental rate and/or conditions for increasing or decreasing the confidence indicator value.

In some implementations, the incremental rate or conditions for increasing the value may be different than the incremental rate for decreasing the value. As such, the knowledge engineer may define asymmetric incremental update rates, for example, to achieve faster emergence of high levels of confidence in certain links, or to achieve a higher selectivity. For example, if the incremental rate of increase is defined to be smaller than the incremental rate of decrease, then a higher proportion of correct suggestions is required to drive the confidence value above a particular threshold. As an illustration, if the confidence indicator for a link increases by 1% each time the suggested response is selected, and if the confidence indicator decreases by 2% each time that suggested response is not selected, then twice as many correct suggestions as incorrect suggestions are required just to support the current value of the confidence indicator. As such, this is one example of a selective update algorithm that may be implemented in the system 600.

Confidence indicator values may be established over time based on collected statistical information. The value of a particular confidence indicator at any given time may be used to select a response with the highest confidence level from among available candidate responses that have a confidence indicator value above a predetermined threshold. The selected response may be applied as an automated response, for example.

An ERMS may classify incoming messages using an intelligent classification scheme such as query-based or example-based classification. Query-based classification is described in detail in commonly-assigned co-pending U.S. patent application Ser. No. 10/822,612, filed Apr. 12, 2004, by C. Ronnewinkel, the entire contents of which are incorporated herein by reference. After classifying a message, the intelligent classification system may auto-suggest quick solutions, experts, and response templates, and may also use predefined rules to determine how to process the incoming e-mail message.

As described above according to one implementation, the system may automatically respond to an incoming message based upon a level of classification accuracy calculated by the classifier 60 (FIG. 1). In one example, the recommendation module 605 may be arranged to record agent-selected responses to incoming messages. In particular, agents may select auto-suggested responses according to their classification, or they may manually classify incoming messages. During run-time, the intelligent classification system may record and compile statistics that may be used to predict which response each agent is most likely to choose when responding to an incoming message of a given classification. The classification may be made using any suitable classification method, including example-based or query-based classification, for example.

Accordingly, in some embodiments, the recommendation module 605 (or other processing module) may collect information about auto-suggested classifications made by the system and information about responses selected by agents. In such embodiments, the recommendation module 605 may also determine an accuracy measure associated with the classification of the incoming message and an accuracy measure associated with the suggested objects for the incoming message. The determined accuracies may be, for example, expressed as a values between zero and one, but may also take on other predetermined ranges, such as a percentage.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

Other implementations are within the scope of the claims.

What is claimed is:

1. A method, comprising:
   determining a confidence indicator (CI) for at least one candidate class for an incoming message received in a response management system, each CI being a function of a comparison between previous selections of the candidate class and previous suggestions of the candidate class for previous messages having one or more similar features, wherein each determined CI represents a likelihood that the corresponding candidate class matches the incoming message, wherein the response management system comprises at least one computer and at least one knowledge base, wherein the at least one knowledge base comprises information related to previous selections of the candidate class and previous suggestions of the candidate class for previous messages having one or more similar features, and wherein determining the CI is performed at the at least one computer using the at least one knowledge base;
   identifying at the at least one computer one or more candidate classes that match the incoming message based on class weights that are functions of each of the determined CIs;
   calculating at the at least one computer a classification accuracy measure that is a function of the class weights;
   selecting at the at least one computer between a manual and an automatic classification mode of operation by comparing the calculated classification accuracy measure to a predetermined threshold; and
   generating at the at least one computer an electronic message for transmission by the response management system in response to the received incoming message, wherein the generated electronic message includes information related to at least one of the identified candidate classes.

2. The method of claim 1, further comprising automatically sending at least one of the identified candidate classes if the automatic classification mode of operation is selected.

3. The method of claim 1, further comprising providing information about candidate classes to a user if the manual classification mode of operation is selected.

4. The method of claim 3, further comprising:
   in response to the user selecting a candidate class, updating the CI for the selected candidate class to represent an increased likelihood that the selected candidate class will match a future incoming message having one or more features that are similar to features of the present incoming message.

5. The method of claim 4, further comprising:
   for each candidate class provided to the user and not selected by the user, updating the CI for that candidate class to represent a decreased likelihood that the candidate class will match a future incoming message having one or more features that are similar to features of the present incoming message.

6. The method of claim 1, wherein identifying one or more matching candidate classes further comprises identifying candidate classes associated with the highest CI from among the candidate classes.

7. The method of claim 1, wherein the class weights are further functions of class scores associated with text-mining.

8. The method of claim 1, wherein the candidate classes are arranged in a hierarchy.

9. The method of claim 8, wherein identifying at least one sufficiently accurate candidate class further comprises identifying a candidate class that is at the lowest level relative to the hierarchy levels of the other candidate classes.

10. A method, comprising:
    determining a confidence indicator (CI) for at least one candidate object associated with a candidate class for an incoming message received in a response management system, each CI being a function of a comparison between previous selections of the object and previous suggestions of the object for previous messages having the same class as the corresponding candidate class, wherein each determined CI represents a likelihood that a corresponding object matches the incoming message, wherein the response management system comprises at least one computer and at least one knowledge base, wherein the at least one knowledge base comprises information related to previous selections of the object and previous suggestions of the object for previous messages having the same class as the corresponding candidate class, and wherein determining the CI is performed at the at least one computer using the at least one knowledge base;
    identifying at the at least one computer one or more candidate objects that match the incoming message based on object weights that are functions of each of the determined CIs;

calculating at the at least one computer a suggestion accuracy measure that is a function of the object weights;
selecting at the at least one computer between a manual and an automatic suggestion mode of operation by comparing the calculated suggestion accuracy measure to a predetermined threshold; and
generating at the at least one computer an electronic message for transmission by the response management system in response to the received incoming message, wherein the generated electronic message includes information related to at least one of the identified candidate objects.

11. The method of claim 10, further comprising automatically sending a response based on one or more of the identified objects if the automatic suggestion mode of operation is selected.

12. The method of claim 10, further comprising providing information about candidate objects to a user if the manual suggestion mode of operation is selected.

13. The method of claim 12, further comprising:
in response to the user selecting one of the candidate objects, updating the CI for the selected object to represent an increased likelihood that the selected object will match a future incoming message having the same class as the present incoming message.

14. The method of claim 13, further comprising:
for each of the candidate objects provided to the user and not selected by the user, updating the CI to represent a decreased likelihood that the object will match a future incoming message having the same class as the present incoming message.

15. The method of claim 10, wherein identifying one or more candidate objects further comprises identifying a candidate object associated with the highest CI from among the candidate objects.

16. The method of claim 10, wherein the object weights are further functions of class confidence indicators (CCIs) and class scores associated with text-mining,
wherein each CCI is a function of a comparison between previous selections of the candidate class and previous suggestions of the candidate class for previous messages having one or more similar features, and each CCI represents a likelihood that the corresponding candidate class matches the incoming message.

17. The method of claim 10, wherein the candidate objects comprise information that may be contained in a response message.

18. The method of claim 10, wherein the candidate objects comprise an instruction to contact to an expert.

19. A computer program product tangibly embodied in a machine-readable storage medium and containing instructions that, when executed on a processor, cause the processor to perform operations, the operations comprising:
determining a class confidence indicator (CCI) for at least one candidate class for an incoming message received in a response management system, each CCI being a function of a comparison between previous selections of the candidate class and previous suggestions of the candidate class for previous messages having one or more similar features, wherein each determined CCI represents a likelihood that a corresponding candidate class matches the incoming message, wherein the response management system comprises at least one computer and at least one knowledge base, wherein the at least one knowledge base comprises information related to previous selections of the candidate class and previous suggestions of the candidate class for previous messages having one or more similar features, and wherein determining the CCI is performed at the at least one computer using the at least one knowledge base;
identifying at the at least one computer one or more candidate classes that match the incoming message based on class weights that are functions of each of the determined CCIs;
calculating at the at least one computer a classification accuracy measure that is a function of the class weights;
selecting at the at least one computer between a manual and an automatic classification mode of operation by comparing the calculated classification accuracy measure to a predetermined threshold; and
generating at the at least one computer an electronic message for transmission by the response management system in response to the received incoming message, wherein the generated electronic message includes information related to at least one of the identified candidate classes.

20. The computer program product of claim 19, the operations further comprising:
determining an object confidence indicator (OCI) for at least one candidate object associated with one of the candidate classes, each OCI being a function of a comparison between previous selections of the object and previous suggestions of the object for previous messages having the same class as the corresponding candidate class, wherein each determined OCI represents a likelihood that a corresponding object matches the incoming message;
identifying one or more candidate objects that match the incoming message based on object weights that are functions of each of the determined OCIs;
calculating a suggestion accuracy measure that is a function of the object weights; and
selecting between a manual and an automatic suggestion mode of operation by comparing the calculated suggestion accuracy measure to a predetermined threshold.

* * * * *